(12) United States Patent
Adling et al.

(10) Patent No.: US 12,353,188 B2
(45) Date of Patent: Jul. 8, 2025

(54) SYSTEM AND METHOD OF MONITORING A CYCLICALLY OPERATING MANUFACTURING DEVICE

(71) Applicant: SIEMENS AKTIENGESELLSCHAFT, Munich (DE)

(72) Inventors: Anja Adling, Nuremberg (DE); Karl Luber, Erlangen (DE); Thorsten Reimann, Erlangen (DE); Juri Behler, Forchheim (DE); Christoph Paulitsch, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/710,682

(22) PCT Filed: Sep. 16, 2022

(86) PCT No.: PCT/EP2022/075805
§ 371 (c)(1),
(2) Date: May 16, 2024

(87) PCT Pub. No.: WO2023/088592
PCT Pub. Date: May 25, 2023

(65) Prior Publication Data
US 2025/0013220 A1     Jan. 9, 2025

(30) Foreign Application Priority Data
Nov. 16, 2021 (EP) .................... 21208384

(51) Int. Cl.
*G05B 19/406*     (2006.01)
(52) U.S. Cl.
CPC .. *G05B 19/406* (2013.01); *G05B 2219/50185* (2013.01)

(58) Field of Classification Search
CPC .................... G05B 19/406; G05B 2219/50185
See application file for complete search history.

(56) References Cited

U.S. PATENT DOCUMENTS 8,781,982 B1 * 7/2014 Das ........................ G06N 3/084
706/21
2018/0181105 A1 * 6/2018 Shindou ............. B23Q 17/0995
(Continued)

FOREIGN PATENT DOCUMENTS

WO     2021050790 A1     3/2021
WO     2021125521 A1     6/2021

OTHER PUBLICATIONS

DeLaus, Michael Daniel. "Machine learning for automated anomaly detection in semiconductor manufacturing" Department of Electrical Engineering and Computer Science, May 2019. pp. 1-72.
(Continued)

*Primary Examiner* — Christopher E. Everett
(74) *Attorney, Agent, or Firm* — Lempia Summerfield Katz LLC (57) ABSTRACT

A computer-implemented method of monitoring a cyclically operating manufacturing device includes measuring actual values of a physical property relating to operation of the manufacturing device during multiple cycles of the operation of the manufacturing device. Reference values are determined for the physical property for each of the multiple cycles based on a trained machine learning model. A distribution of the actual values is compared with a distribution of the reference values based on a distance function, and an alert is initiated when the distance function exceeds a predetermined threshold.

16 Claims, 10 Drawing Sheets

(56) References Cited

U.S. PATENT DOCUMENTS

| | | | |
|---|---|---|---|
| 2019/0094108 A1* | 3/2019 | Liao | G01M 13/00 |
| 2020/0125930 A1* | 4/2020 | Martin | G06N 3/082 |
| 2020/0370996 A1* | 11/2020 | Liao | G01M 13/00 |
| 2020/0371491 A1* | 11/2020 | Wong | G05B 13/027 |
| 2020/0371512 A1* | 11/2020 | Srinivasamurthy | G06V 20/70 |
| 2020/0379454 A1 | 12/2020 | Trinh | |
| 2020/0387135 A1* | 12/2020 | Khorasgani | G05B 19/406 |
| 2021/0191384 A1 | 6/2021 | Trenchard | |
| 2022/0188644 A1* | 6/2022 | Zoldi | G06N 3/045 |
| 2022/0246457 A1* | 8/2022 | Sundar | H01L 21/67288 |
| 2023/0418257 A1* | 12/2023 | Albrile | G06T 7/0004 |

OTHER PUBLICATIONS

Ghosh, Arup, Gi-Nam Wang, and Jooyeoun Lee. "A novel automata and neural network based fault diagnosis system for PLC controlled manufacturing systems." Computers & Industrial Engineering 139 (2020): 106188. pp. 1-16.

PCT International Preliminary Examination Report and Written Opinion of International Examination Authority mailed Jul. 11, 2023, corresponding to PCT International Application No. PCT/EP2022/075805.

PCT International Search Report and Written Opinion of International Searching Authority mailed Feb. 10, 2023, corresponding to PCT International Application No. PCT/EP2022/075805.

European Search Report for European App. No. 21208384.4-1203 mailed May 27, 2022.

\* cited by examiner

SYSTEM AND METHOD OF MONITORING A CYCLICALLY OPERATING MANUFACTURING DEVICE

PRIORITY

This application is the National Stage of International Application No. PCT/EP2022/075805, filed Sep. 16, 2022, which claims the benefit of European Patent Application No. EP 21208384.4, filed Nov. 16, 2021. The entire contents of these documents are hereby incorporated herein by reference.

TECHNICAL FIELD

The present embodiments relate to the manufacture of a product and the monitoring, diagnostics, and maintenance of manufacturing devices in a manufacturing facility.

BACKGROUND

For example, in automotive production, failures at individual stations may quickly put the entire production system out of operation. Faults are often caused by small things such as bearing wear, deposits, excessive moisture, or leaks in the lubricating oil distribution system. Regular maintenance intervals are not sufficient to avoid unplanned downtime. It is important to monitor the status of the production systems and to recognize impending errors in advance.

In the automotive industry, presses, for example, are critical assets in the manufacturing process. Their failure may shut down entire production lines. Predictive services for presses enable the operator of such production lines to identify and/or predict upcoming errors before the errors occur and/or to perform corrective action. Thereby, maintenance may be aligned to the actual condition of the system and are not dependent on fixed maintenance intervals.

Downtime of an automotive press is extremely costly. Automotive plants are to keep unplanned downtime as low as possible in order to remain competitive in the market. For example, press lines are extremely critical and may have a large impact on overall production costs and effectiveness.

Figure 1:
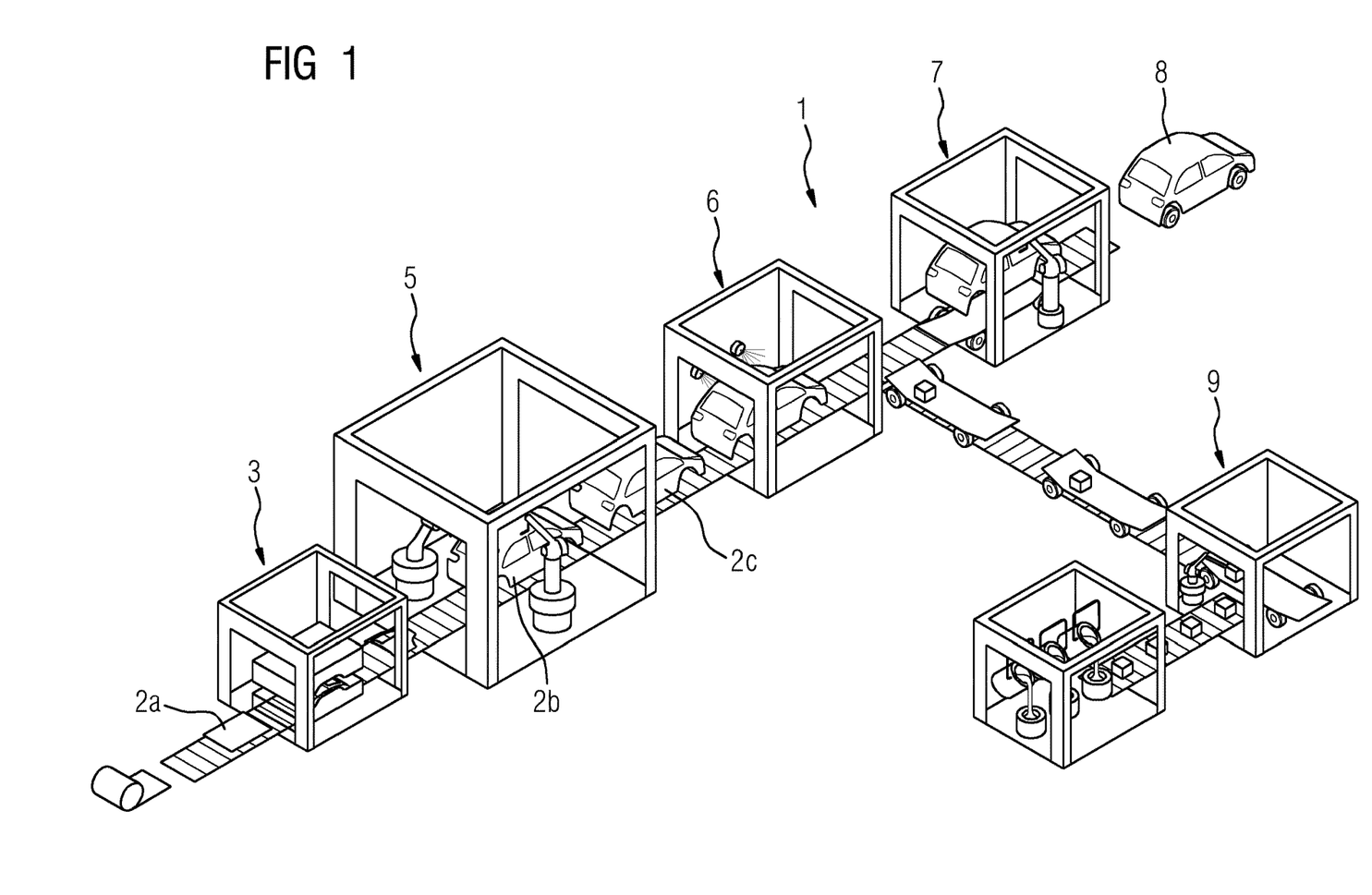
FIG. 1 shows a schematic illustration of an automotive production.

Automotive production may include further production steps at different production stations, such as body shop, paint shop, foundry, powertrain assembly, and final assembly where workpieces are welded, painted, casted, and/or assembled using one or more manufacturing devices, as shown in FIG. 1.

SUMMARY AND DESCRIPTION

The scope of the present invention is defined solely by the appended claims and is not affected to any degree by the statements within this summary.

In any manufacturing facility, unplanned downtimes (e.g., of a drive train of a press line) are extremely cost intensive. Further, no system is available to collect necessary data for the detection of wear and tear of the one or more manufacturing devices and to reliably determine and/or predict an error in the operation of the manufacturing device.

The present embodiments may obviate one or more of the drawbacks or limitations in the related art. For example, these drawbacks may be overcome, transparency of operation of one or more manufacturing devices may be provided, and monitoring of the one or more manufacturing devices may be allowed. As another example, unplanned downtime of the one or more manufacturing devices (e.g., by early detection of anomalies due to wear and/or tear) may be reduced, and an optimized maintenance scheduling may be provided.

According to a first aspect, a computer-implemented method of monitoring a cyclically operating manufacturing device is provided. The method includes measuring actual values of a physical property relating to the operation of the manufacturing device during multiple cycles of the operation of the manufacturing device. The method further includes determining reference values for the physical property for each of the multiple cycles based on a trained machine learning model (e.g., an artificial neural network or a multilayer perceptron). The method further includes the act of comparing a distribution of the actual values with a distribution of the reference values based on a distance function (e.g., a Wasserstein distance). The method further includes the act of initiating an alert in case the distance function exceeds a predetermined threshold.

According to a second aspect, an apparatus operative to perform the method acts according to the first aspect is provided.

According to a third aspect, the object is achieved by a computer program product including program code that when executed performs the method according to the first aspect.

DETAILED DESCRIPTION

FIG. 1 shows a schematic illustration of an automotive production 1. The automotive production 1 discussed in the following is an example of a manufacturing facility. The same or similar problems and solutions may be applied to other kinds of manufacturing facilities and manufacturing devices employed therein. In automotive production 1, steel and/or aluminum sheets 2a are formed into extremely precise body parts. Sheeting is cut away in the metal forming process. The forming tools and tremendous press forces convert steel or aluminum rolls (e.g., "coils") into complex geometries of individual body parts in one or more process acts. The press shop 3 is where sheet metal components 2a are pressed into their required shape. The mechanically or hydraulically driven machines used therein are able to produce pressing forces of several thousand tons.

At a body shop 5, bonded seams are applied to body parts 2b in order to build a car body 2c. Therein, the components needed to construct a vehicle (e.g., mounting plates, profiles, reinforcements, etc.) are permanently joined together using the processes of spot welding, laser welding, bonding, or soldering. Once the parts have been fixed into the right shape, the several thousand welding points are required to make the structure rigid.

The car body 2c then has a number of coats of paint applied to the car body 2c in a paint shop 6 before proceeding to a final manufacturing station, an assembly area, where all vehicle 8 components are put together. At an assembly shop 7, the different car parts (e.g., including the powertrain) are assembled to arrive at a final product 8. As also shown in FIG. 1, metal components are cast at a foundry and assembled to form a powertrain at one or more production or manufacturing stations 9.

At all of the different shops 3, 5, 6, 7 in the manufacturing facility, the manufacturing devices are operated cyclically. In other words, the one or more manufacturing devices repeatedly execute one or more actions (e.g., operate in accordance with one or more motion cycles). These cycles may include a cycle time for the one or more manufacturing steps to be executed. Such cycles may include material provision for component parts and/or conveying the semi-finished products. Further cycles may include precision geometric positioning of parts to be joined.

Figure 2:
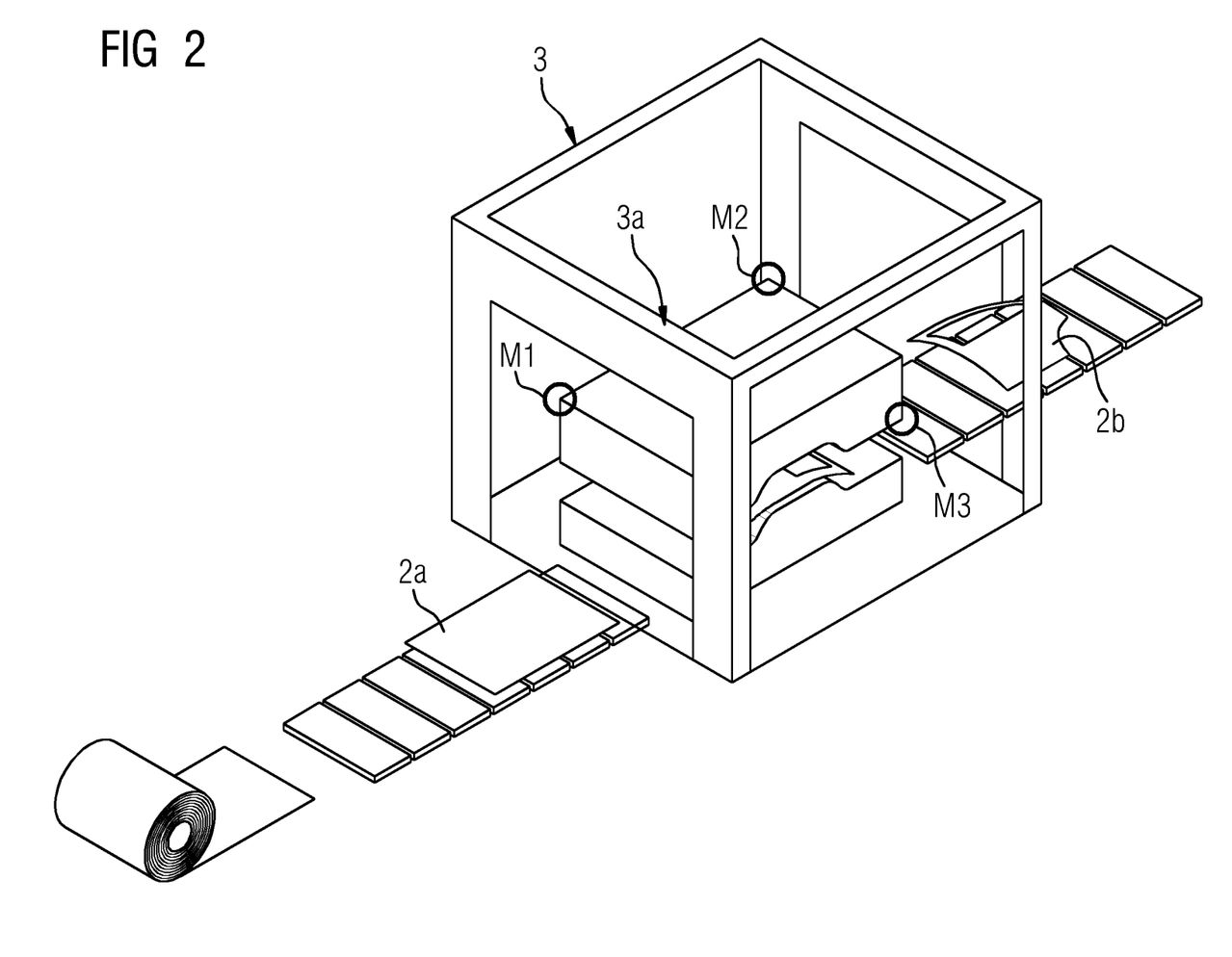
FIG. 2 shows a schematic illustration of a press shop.

FIG. 2 shows a schematic illustration of a press shop 3. The press shop 3 serves as an example of a manufacturing station including one or more manufacturing devices that operate cyclically (e.g., where one or more manufacturing steps are repeatedly executed). One or more manufacturing devices at one or more other manufacturing stations also operate cyclically (e.g., at the body shop 5, where the body parts 2b are welded to each other repeatedly).

In order to monitor the operation of the one or more manufacturing devices, one or more sensors M1, M2, M3 may be used for measuring actual values of a physical property that relates to the operation of the manufacturing device. The one or more sensors M1, M2, M3 are thus placed closed to the manufacturing device and/or are connected to the manufacturing device (e.g., a machine press 3a). The one or more sensors may measure physical properties such as temperature, frequency, pressure, or the like, respectively. The actual values measured may be used to characterize the operation of the manufacturing device and may be indicative of certain operating modes of the manufacturing device. For example, the actual values may be indicative of a nominal operation or an abnormal operation of the manufacturing device. The actual values of the one or more sensors M1, M2, M3 may thus be processed in order to arrive at a conclusion regarding the state of the operation and the condition of the manufacturing device.

Figure 3:
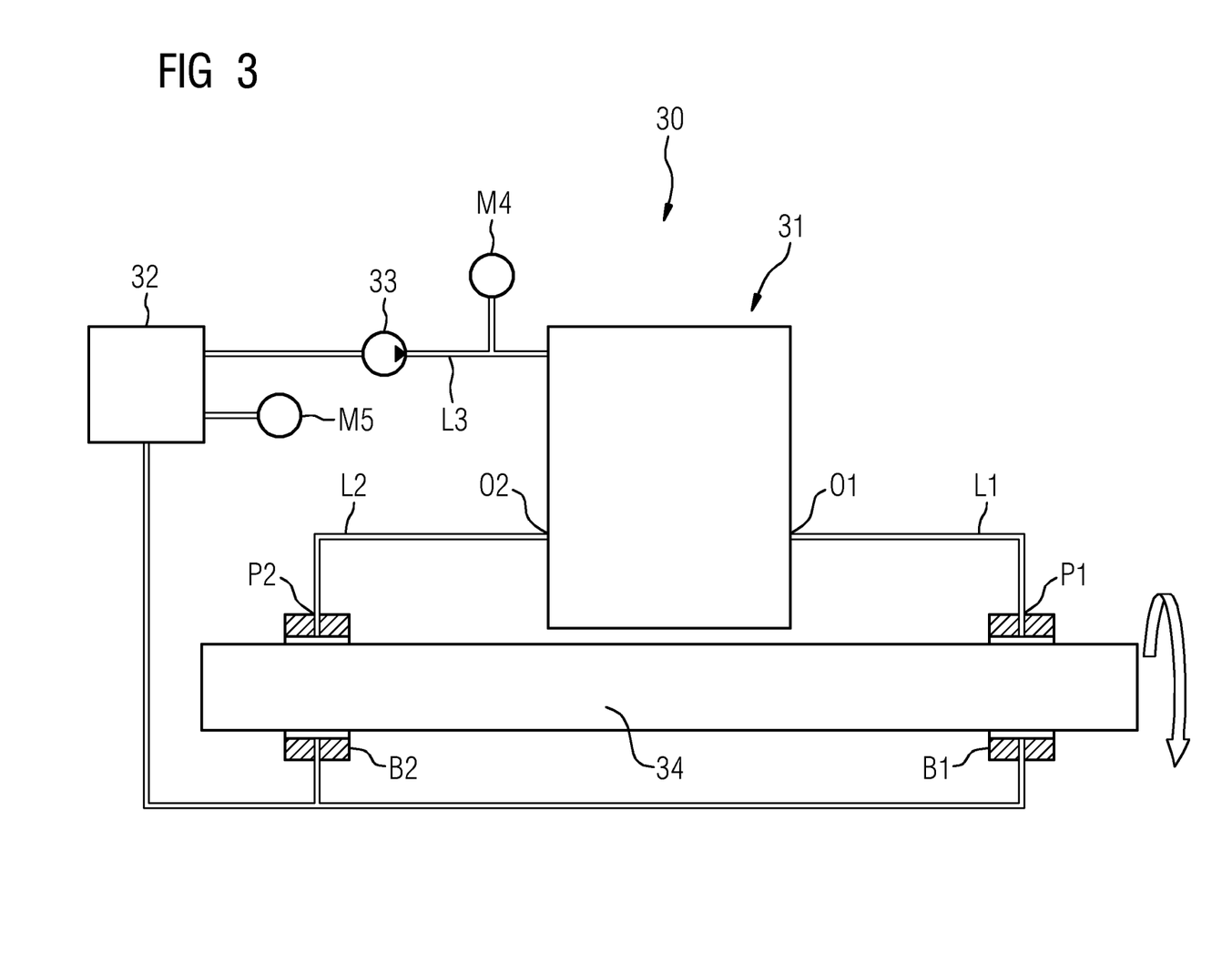
FIG. 3 shows a schematic illustration of a lubrication system, including a lubrication distributor, for a machine press.

FIG. 3 shows a schematic illustration of a lubrication system 30 for a machine press 3. A machine press 3a is a machine tool that changes the shape of a workpiece by the application of pressure. Such a machine press 3a is an example of a manufacturing device employed at one or more manufacturing stations in a manufacturing facility. The machine press 3a may be used in a press shop 3 (e.g., of an automotive production), as described above.

The bearings B1, B2 (e.g., sliding bearings) of a machine press 3a may be supplied with a lubricant by one or more lubrication distributors 31. A lubrication distributor 31, also known as a progressive distributor, distributes the lubricant supplied in, for example, small, dosed amounts (e.g., progressively) and in a certain order over the individual outlets O1, O2 to the connected friction points (e.g., lubrication points P1, P2) of one or more of bearings B1, B2 (e.g., of a shaft 34 of the machine press that drives a ram of the machine press). After the last friction point has been treated, the lubrication process automatically returns to the first friction point. Thus, the lubrication results in a cyclic operation. If there is a disturbance of a lubrication line L1, L2 (also referred to as supply line) and if the disturbance remains unnoticed, a lubrication point P1, P2 may no longer be supplied, and the bearing B1, B2 runs dry. As a result, severe damage to the bearing B1, B2 occurs, and the machine press 3a may then fail. This may result in an interruption of the production for up to several weeks until the machine press is repaired when delivery time of a spare part, disassembly, and installation of the new part are considered. A full breakdown of the lubrication may lead to a failure of the machine press 3a within a few minutes and is therefore to be detected in a relatively short time. Downtimes as the ones just described may cause large costs on the part of the operator of the manufacturing facility.

A pump 33 is used to transport the lubricant from the reservoir 32 to the lubrication distributor 31. A temperature sensor M5 may be used to measure the temperature of the lubricant in the reservoir. In order to monitor the operation of the machine press 3a, it is possible to measure the pressure at a supply line L3 connecting the lubrication distributor 31 to a lubrication reservoir 32 (e.g., using a sensor M4). However, deviations in the pressure curve due to a tear cannot be detected using classic condition monitoring due to the high variance of the pressure signal. Thus, a more sophisticated approached is provided.

Figure 4:
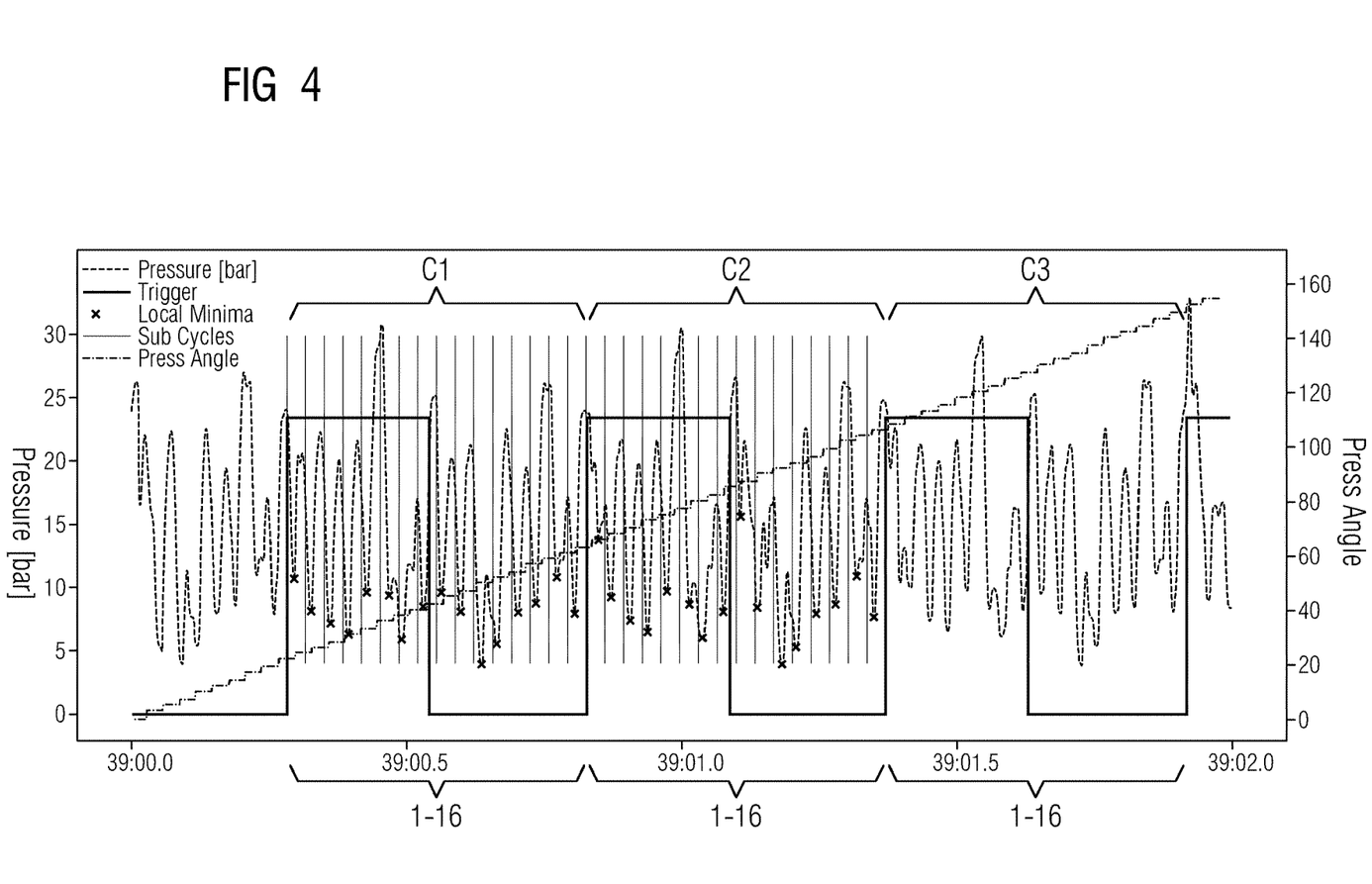
FIG. 4 shows the pressure of a supply line of a lubrication distributor as a function of time.

FIG. 4 shows the pressure curve of a supply line (e.g., of supply line L3 of FIG. 3 as described above) of a lubrication distributor 31 as a function of time. The pressure curve is characterized by a number of peaks that correspond to the lubricant being supplied to and subsequently released by the lubrication distributor 31. The pressure curve, given in units of bar, is determined by actual values being measured (e.g., by a pressure sensor M4).

FIG. 4 also shows the press angle. The press angle describes a complete movement of the ram of the press from its upper reversal point into the lower reversal point, and back to the upper reversal point. The press angle changes from 0° to 360°.

The actual values making up the pressure curve may be divided into cycles C1, C2, C3 (e.g., lubrication distributor cycles) that may be subdivided into subparts. Such a division may be based on the specific characteristics of the manufacturing device. In this case, the lubrication distributor 31 includes 16 lubrication points and/or lubrication distributor outputs. Accordingly, the pressure curve is divided into cycles C1, C2, C3, each including 16 subparts. The periods of the subparts may thus be determined by considering the time span between rising edges of the pressure curve. Subsequently, a first local minimum within each subpart 1-16 may be determined. The local minima are identified by an x in FIG. 4. These minima correspond to the lubricant being ejected by the respective lubrication points P1, P2 and/or lubrication distributor outputs O1, O2. Alternatively, or in addition, the pressure peak between each local minimum pair may be calculated. In any case, a local extremum of the pressure curve may be used.

Further actual values from other physical properties relating to the operation of the manufacturing device during multiple cycles C1, C2, C3 of the operation of the manufacturing device may be obtained, for example, from other sensors coupled to or attached to the machine press, or the manufacturing device in general. For example, in the case of a machine press related variables like stroke rate of the machine press, press angle, temperature, and cycle time may be obtained. Such actual values may be stored in a memory, for example, in form of a table in a database (e.g., for obtaining training data for training a machine learning model as will be described herein later).

Figure 6:
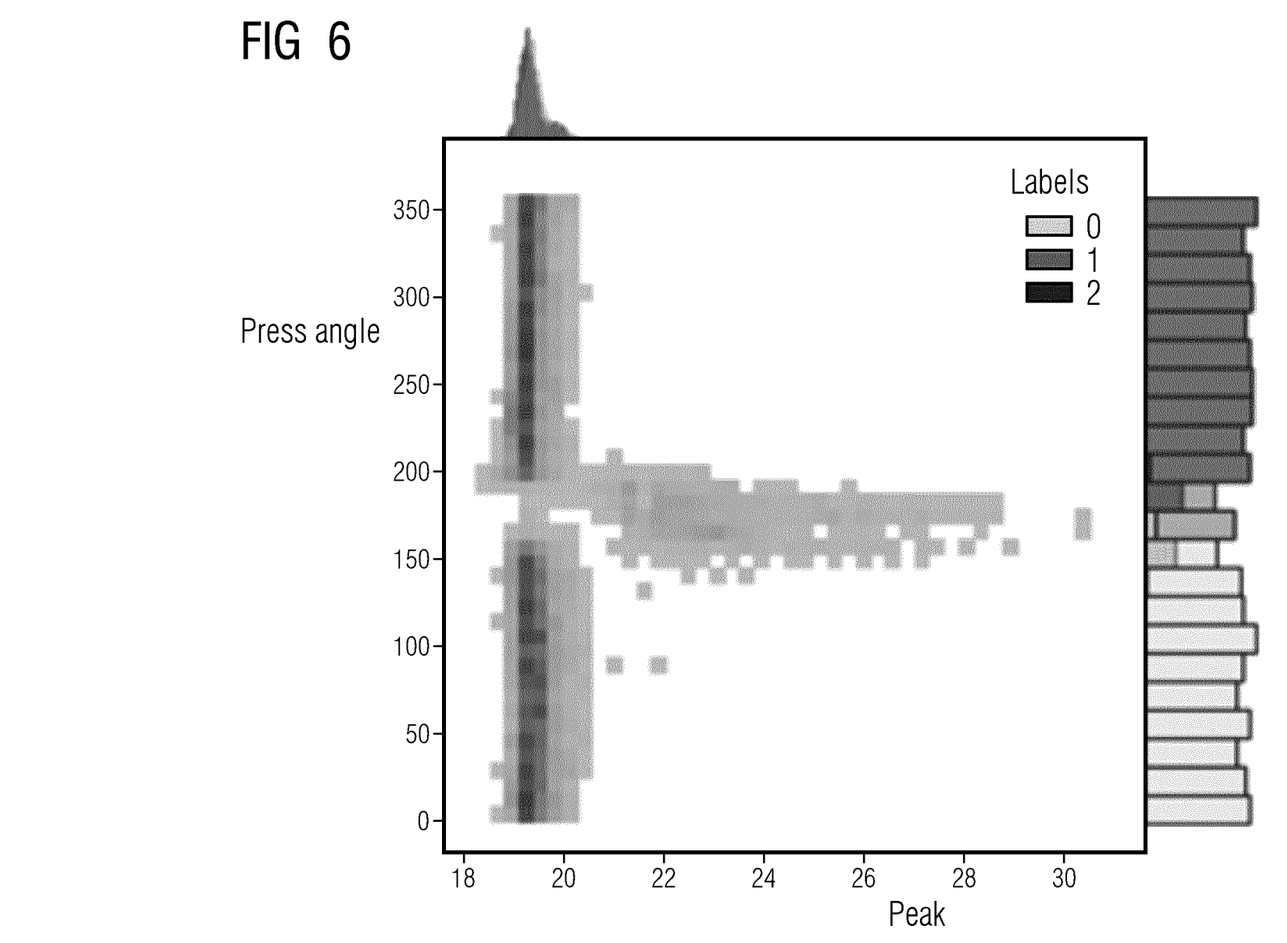
FIG. 6 shows an illustration of the dependency between the press angle and pressure peak.

Further, the press angle may be encoded in the form of a one-hot code, as shown in FIG. 6. Different press angle ranges may thus be defined, and the one-hot code may be assigned to identify the different angle ranges. The angle ranges may be defined using a gaussian mixture model that identifies two or more angle ranges. These angle ranges may then be encoded in a one-hot vector using the one-hot code. The one-hot vector may then be associated with the actual values, for example, by adding the one-hot vector to the respective table entry (e.g., storing the one-hot vector). The stored information may then be used for training a machine learning model as will be described later on. For example, in case of three press angle ranges, 001 may represent the first range, 010 may represent the second range, and 100 may represent the third range. The first range may be given to press angles between 0° and 160°, the second range may be given to press angles between 160° and 200°, and the third range may be given to press angles between 200° and 360°. Accordingly, a peak (e.g., maximum, minimum, or extremum) is assigned a one-hot-code dependent on the press angle at which the peak occurred.

Figure 5:
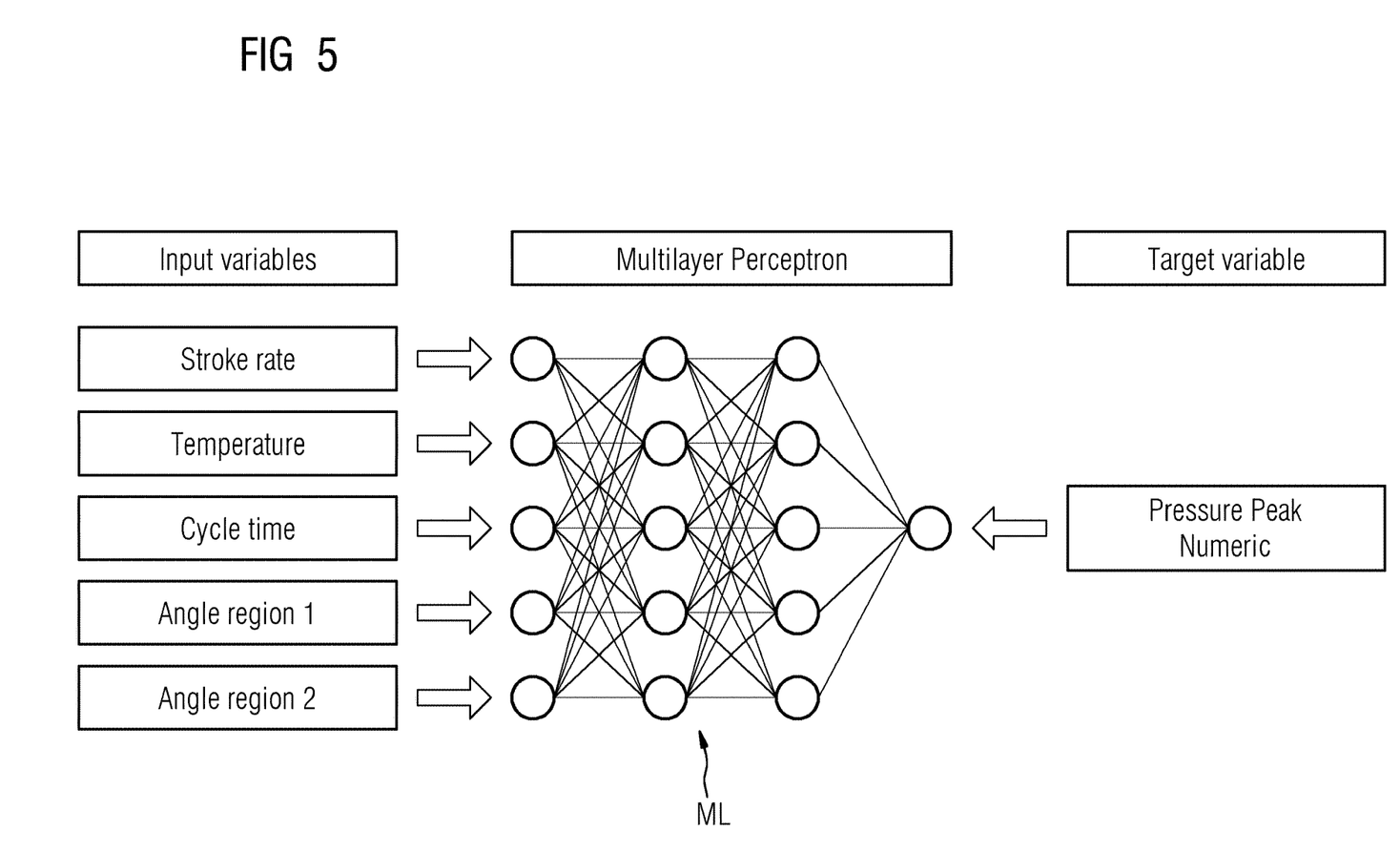
FIG. 5 shows an illustration of a machine learning model and its input and target variables.

By analyzing the actual values of the measured variables and their influence on the pressure peak value, linear and non-linear relationships may be observed. These observations may then be used for determining reference values, as well as for the pre-processing of the actual values (e.g., by the machine learning model). The following variables representing a physical property of the operation of the machine press were identified as influencing factors on the pressure peak value, as shown in FIG. 5. Press angle (e.g., exerting a non-linear influence on pressure) is one of the variables. Due to the non-linear influence of the press angle (e.g., 0°-359°) on the pressure peak value, a pre-processing is to be performed. The basic principle behind this is the division of the press angle in two ranges with the help of a gaussian mixture model. The determined ranges are encoded and stored for training and inference of the machine learning model (e.g., stored as a 1-out-n-vector; one-hot vector). FIG. 6 shows an example of a lubrication point, where the dependency between the press angle and pressure peak are illustrated and where the press angle has been divided into different ranges denoted as 0, 1, and 2. Stroke rate (e.g., exerting a linear influence on the pressure) is one of the variables. For the robustness of the prediction, the values of the stroke rate are normalized to values between 0 and 1. Temperature of the lubricant container (e.g., exerting a linear influence on the pressure) is one of the variables. The values of the temperature are normalized to values between 0 and 1. Cycle time of the lubrication distributor (e.g., exerting a linear influence on the pressure) is one of the variables. The cycle time is determined by the temporal difference of the ascending edges of a speed trigger. For the robustness of the model, the values of the cycle time are also normalized to values between 0 and 1. Thereby, the peak pressure value is set into relation with the cycle time of the lubrication distributor.

A multilayer perceptron (e.g., artificial neural network) may be chosen as machine learning model ML, as shown in FIG. 5. The multilayer perceptron is capable of extrapolating and may therefore also process input values/variables that the multilayer perceptron was not trained on or are out of a training data distribution in order to calculate realistic pressure peak values (e.g., that may be used as reference values). In one embodiment, a different machine learning model is trained and/or used for each lubrication point. A generalized approach with only one machine learning model per lubrication distributor may also be used but is less preferred.

Having obtained the actual values of one or more pressure peaks and the reference values generated by the machine learning model ML, a comparison between the values may be performed. To compare the actual pressure peak value(s) and the calculated pressure peak value(s), a distance metric such as the Wasserstein distance may be used. One or more threshold values may be used for initiating a warning and/or alarm (e.g., in case the distance determined exceeds one or more of thresholds). Such alerts may be determined empirically. The threshold(s) for the one or more alerts may also be determined empirically based on an evaluated impact of the error. For example, the operation of the manufacturing device may be considered nominal in case the Wasserstein distance is less than 3. A warning may be issued in case the Wasserstein distance is between 3 and 5. In case the Wasserstein distance is greater than 5, an alarm may be issued.

Figure 7:
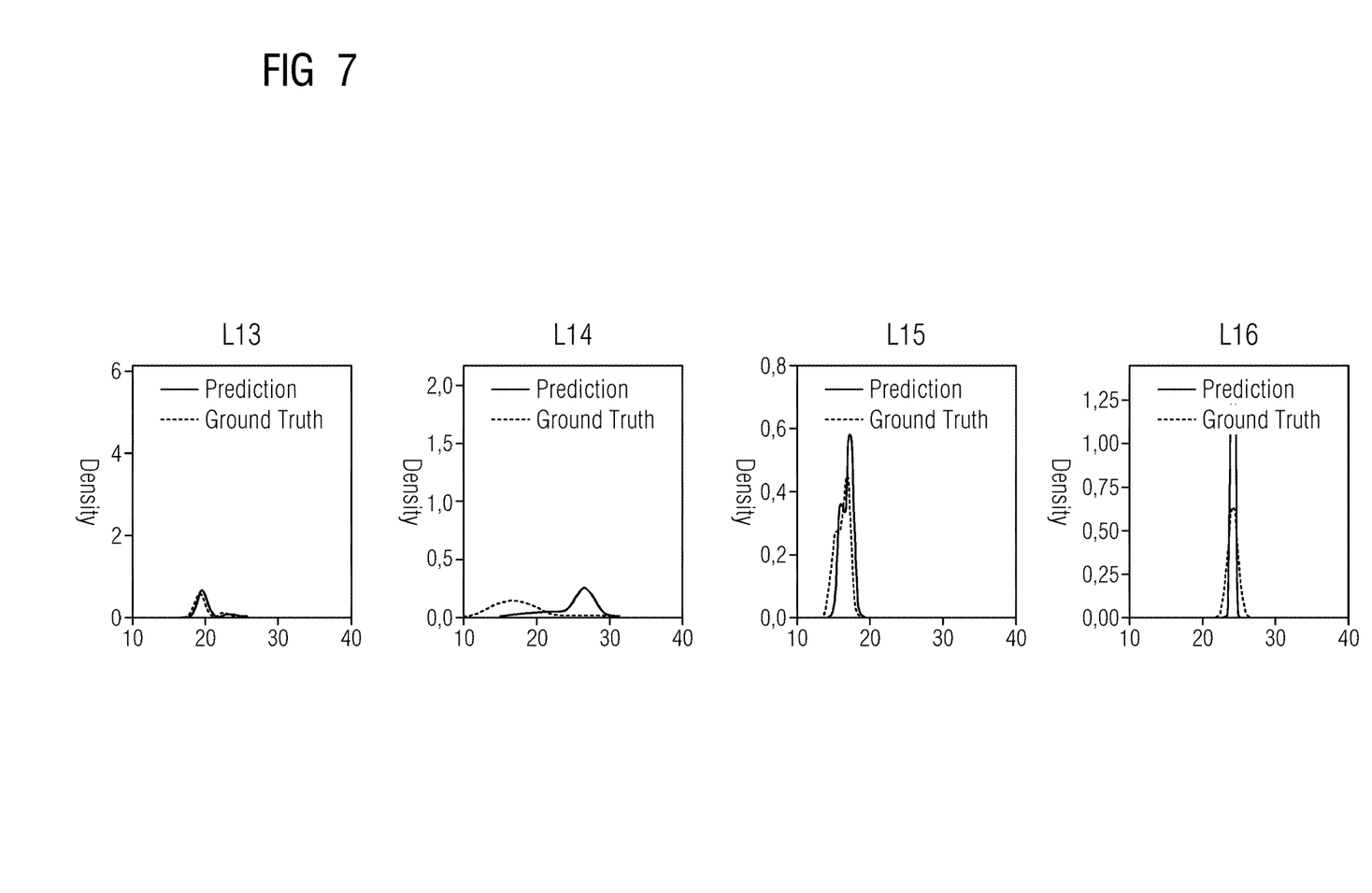
FIG. 7 shows actual values and reference values of the pressure for different lubrication points.

In FIG. 7, the prediction (e.g., the reference values) and ground truth (e.g., the actual values) are shown for different lubrication points (e.g., lubrication points L13, L14, L15, and L16). The discrete reference values and discrete actual values have been fitted in order to obtain a smooth and continuous curve. In one embodiment, all lubrication points are monitored simultaneously during operation of the machine press. As shown in FIG. 7, the prediction for lubrication points L13, L15, and L16 deviates only slightly from the actual values, whereas for lubrication point L14, the prediction deviates significantly from the actual values.

Figure 8:
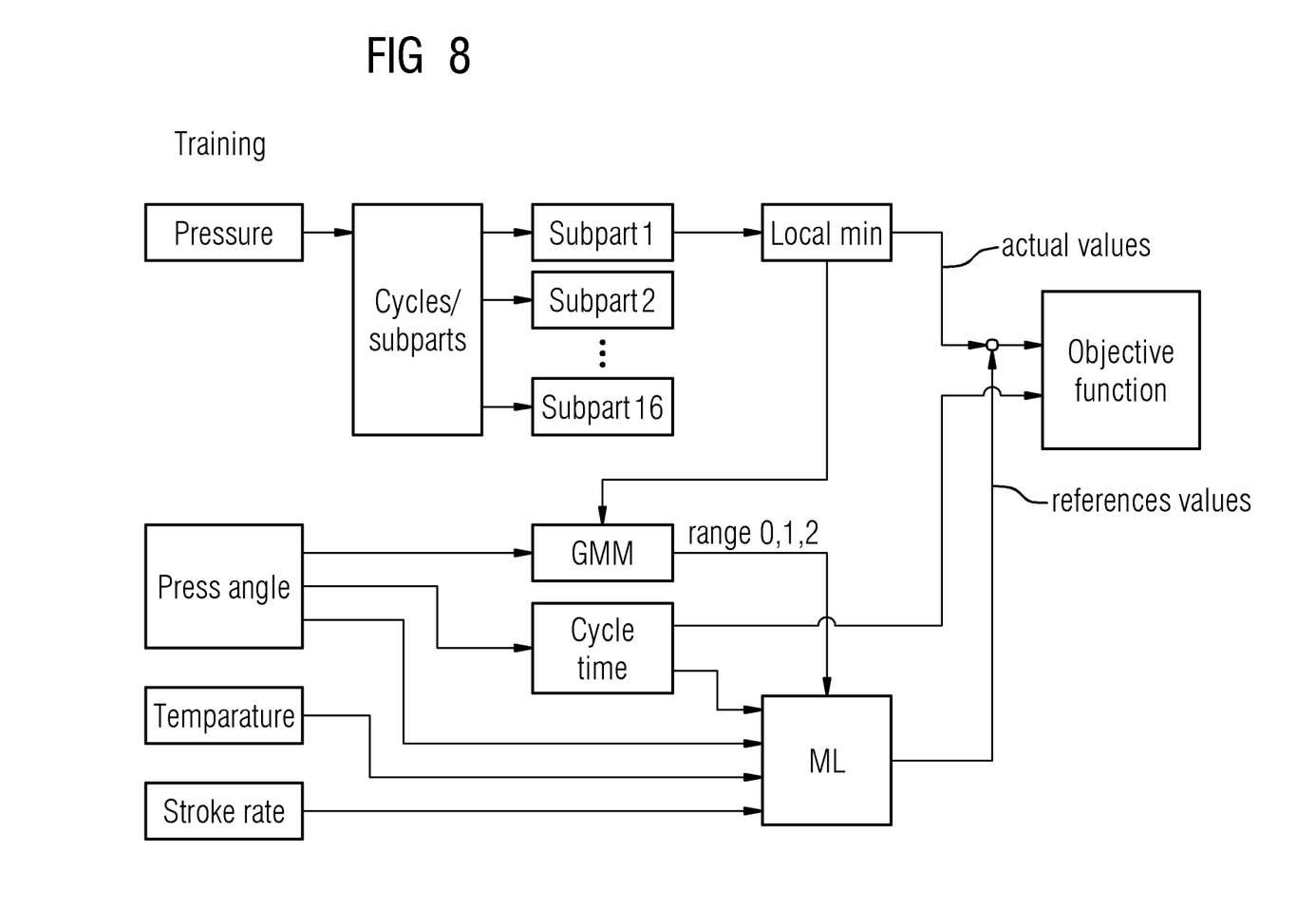
FIG. 8 shows an example embodiment for training a machine learning model.

In FIG. 8, an example embodiment for training a machine learning model ML is shown. Multiple measured values are input into the machine learning model ML. As in the above, the measured values represent physical properties of the operation of the manufacturing device such as the machine press. The pressure in the inlet and/or outlet of the lubrication distributor is measured, and subparts of the full cycle(s) of the lubrication distributor are identified in the pressure signal. Then, a local minimum "Local min" of each subpart is determined. Alternatively or additionally, another statistical characteristic of the subpart may be determined.

The actual (e.g., pressure) values of the local minima of the subpart may then be clustered based on the press angle using a gaussian mixture model. A multivariate Gaussian mixture model "GMM" is used to cluster data into k number of groups where k represents each state of the machine. As the case may be, another clustering algorithm may be used.

The result of the clustering is a set of angle ranges that are used to train the machine learning model ML. In addition to this angle range, the cycle time of the lubrication distributor may be determined and input into the machine learning model ML. Further, the measured values representing the press angle may be input into the machine learning model ML. In addition, the temperature values measured and the stroke rate of the machine press may be input into the machine learning model ML. The machine learning model ML is configured to output a peak pressure value, such as a local minimum, based on the input values/variables. These peak pressure values may then serve as reference values for the actual pressure peaks (e.g., local minima in the pressure signal). The deviation between the actual peak pressure values may be compared to the reference values using an objective function in order to adapt the machine learning model ML. The training is complete when the machine learning model ML outputs reference values sufficiently accurate (e.g., by minimizing the difference between the actual values and the reference values according to the objective function). The result is a machine learning model ML capable of inferring reference values for the pressure peaks based on the actual values input. The training of the machine learning model ML is based on actual values representing nominal operation of the manufacturing device.

Figure 9:
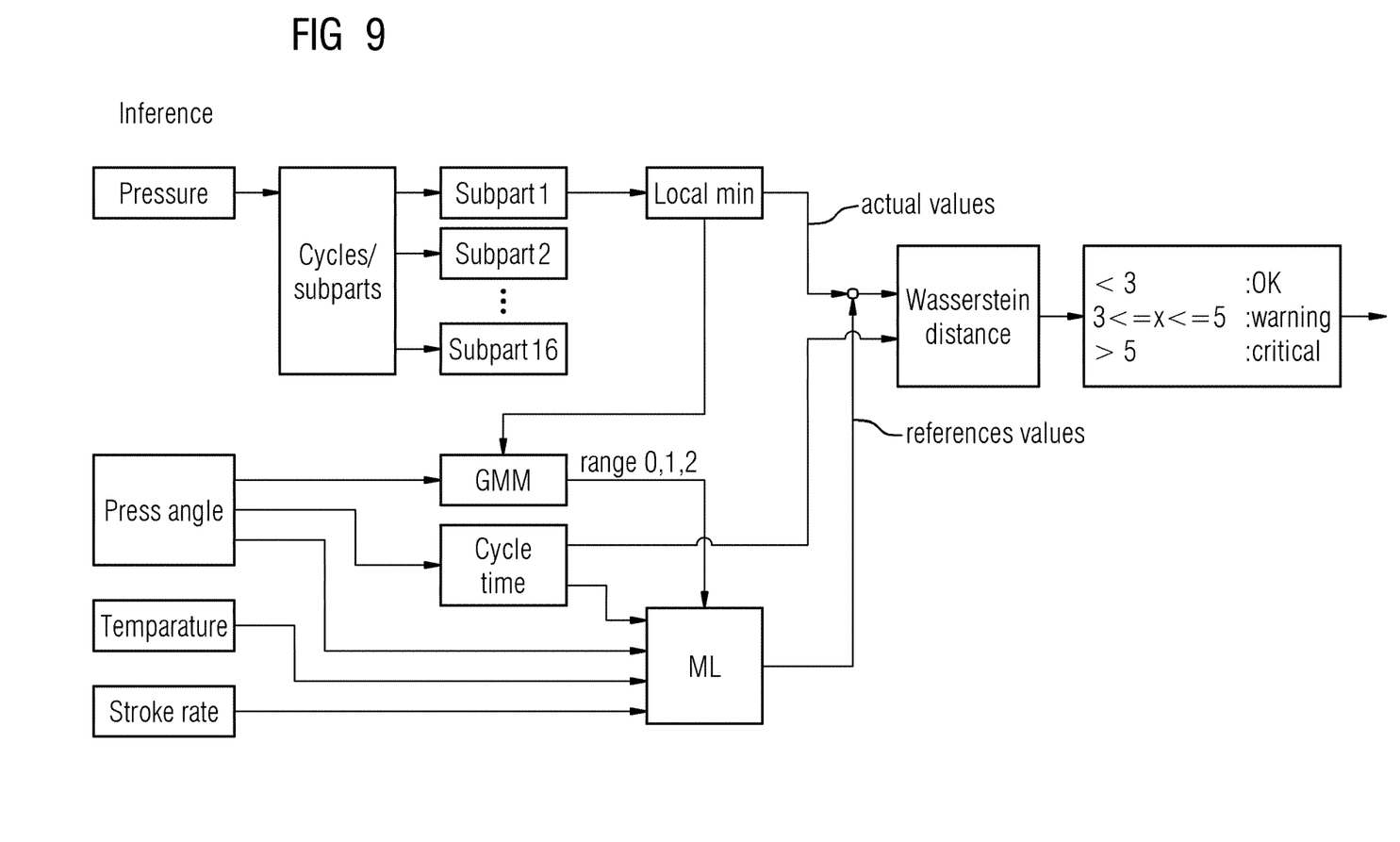
FIG. 9 shows an example embodiment for inferring reference values by a trained machine learning model.

In FIG. 9, an example embodiment for inferring reference values by a trained machine learning model ML is shown. The training may be performed according to the embodiment described in the previous FIG. 8. As in FIG. 8, pressure values, press angle, temperature, and stroke rate are measured or otherwise determined or obtained. Now however, these values are measured during the operation (e.g., productive operation) of the machine press in order to monitor the operation of the machine press. During the operation of the machine press, failures may occur, and any abnormal situation of the machine press is to be identified. Thus, the pressure peaks inferred by the machine learning model ML are now compared to the actual values of the pressure peaks. A distance metric is thus used to determine a distance between the actual pressure peak and the pressure peak inferred by the machine learning model ML that serves as a reference value. In the present embodiment, the Wasserstein distance is used. The actual values (e.g., of the pressure peak(s)) and the reference values may be sampled for a predetermined number of cycles of the lubrication distributor yielding a distribution for the actual values (e.g., of the pressure peak(s)) and the reference values, respectively. The Wasserstein distance between these two resulting distributions may then be determined. This distance may then be compared to one or more predetermined thresholds. In case the distance exceeds one or more of the thresholds, this may be an indication that a failure has occurred. Thus, in case the distance exceeds one or more thresholds, a corrective action may be initiated (e.g., by initiating an alert). A corrective action may include repairing a leak in a supply line, reducing (e.g., automatically reducing) the machine press production speed, and/or increasing (e.g., automatically increasing) the lubricant pressure (e.g., by increasing the pump speed). For example, the press production speed and/or the lubricant pressure may be adjusted automatically in case of an alert. Further, a maintenance request may be initiated (e.g., by issuing a message to an operator of the machine press, production line, or manufacturing facility). Alternatively, the machine press may be shut down. A started lubrication cycle and/or pressing process may thus be completed in order to achieve a controlled shutdown of the lubrication distributor, the machine press, and/or the production line (e.g., instead of an emergency shutdown of the same).

The Wasserstein distance is a distance function defined between distributions (e.g., probability distributions on a given metric space). The Wasserstein distance is a way to compare the distributions of two variables X and Y (e.g., in this case, a distribution of the actual values with a distribution of the reference values). This is, for example, useful in cases where one variable is derived from the other variable by small, non-uniform perturbations (e.g., random or deterministic). In the present case, the reference values are obtained by the ML model, which was trained on the actual values. A discrete distribution or a continuous distribution may be used. For example, a distribution may be fitted to the actual values and/or to the reference values.

In case of one or more (e.g., a plurality of) supply lines, an alert may identify the individual lubrication line and/or outlet of the lubricator for which an error has been detected. A corrective action may then be initiated. For example, an operator may then conduct an error search and/or repair the faulty supply line.

Figure 10:
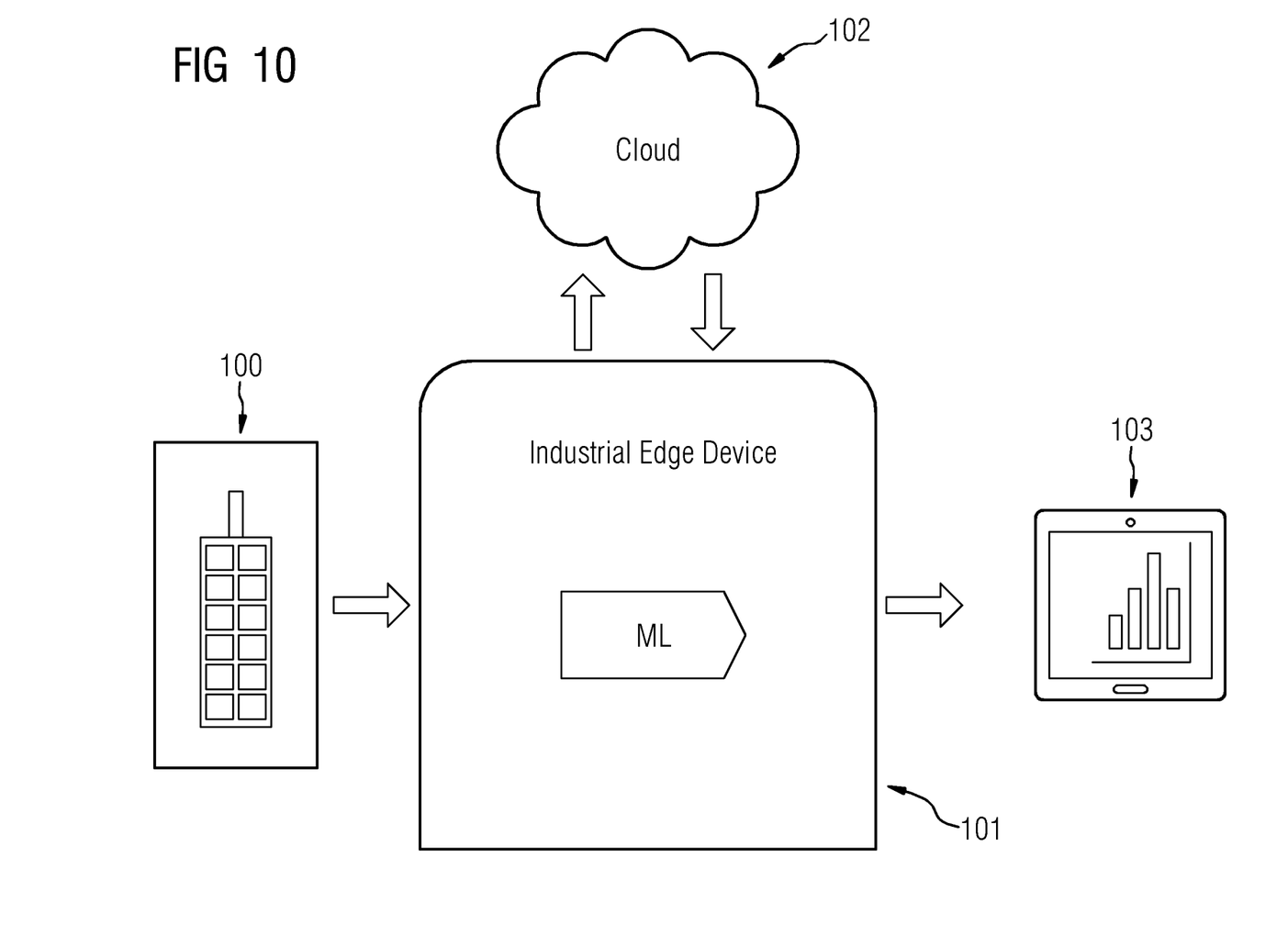
FIG. 10 shows an example embodiment including a manufacturing device communicatively coupled to an industrial edge device.

Turning to FIG. 10, an embodiment including a manufacturing device 20, such as the previously described machine press, communicatively coupled to an industrial edge device 101 is shown. The industrial edge device 101 may host the machine learning model ML and further software modules for performing the steps as described in the above in order to monitor the operation of the manufacturing device 100. The industrial edge device 101 may include one or more processors and one or more memories (e.g., at least one non-transitory storage medium). The memory may include program code that when executed by the one or more processors performs the acts of any one of the embodiments described in the above. The actual values may be obtained from the manufacturing device and/or one or more additional sensors coupled or attached to the manufacturing device 100, not shown. The industrial edge device 101 may store the actual values either locally and/or may transmit the actual values to a memory in a cloud 102. The machine learning model ML may be trained, for example, based on actual values representing nominal operation of the manufacturing device 100. The trained machine learning model ML may then be deployed on the industrial edge device 101. Hence, during operation of the manufacturing device 100, the trained machine learning model ML may be used to determine an abnormal operation of the manufacturing device 100 as described in the above. The result of such a finding may be presented to a user via a graphical user interface (e.g., a dashboard of a handheld device 103 on which the operation of the manufacturing device 100 is illustrated).

According to an aspect, a method of training a machine learning model ML for monitoring the operation of a cyclically operating manufacturing device 3a is provided. The method may include the act of subdividing actual values relating to the cyclic operation of the manufacturing device 3a into actual value subsets according to subpart 1-16 of the operation of the manufacturing device 3a. Therein, each cycle C1, C2, C3 of the cyclic operation of the manufacturing device 3a may include multiple subparts 1-16. The method may further include determining two consecutive minima and/or maxima of the actual values (e.g., for determining the subparts and/or the (corresponding) actual value subsets). The method may further include calculating a statistical characteristic (e.g., a maxima or minima) for the subset of each subpart 1-16. The method may further include determining operating values of one or more operating variables relating to the operation of the manufacturing device 3a. The method may further include identifying different ranges of actual values (e.g., of an operating variable) within each subpart 1-16 based on a mixture model GMM (e.g., a gaussian mixture model) and one-hot encoding the ranges identified. The method may further include training a machine learning model ML based on the operating values and the one-hot encoded ranges as input variables and the statistical characteristic of the subset as a target variable.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of monitoring a cyclically operating manufacturing device for detection of anomalies due to wear, tear, or wear and tear, the method being computer-implemented and comprising:
   measuring actual values of a physical property relating to the operation of the manufacturing device during multiple cycles of the operation of the manufacturing device;
   determining operating values of one or more operating variables relating to the operation of the manufacturing device;
   determining reference values for the physical property for each of the multiple cycles based on a trained machine learning model, the trained machine learning model being an artificial neural network, the artificial neural network being a multilayer perceptron, the determining of the reference values comprising inputting the operating values into the trained machine learning model;
   comparing a distribution of the actual values with a distribution of the reference values based on a distance function, the distance function being a Wasserstein distance; and
   initiating an alert when the distance function exceeds a predetermined threshold, the alert indicating a malfunction of the manufacturing device.

2. The method of claim 1, further comprising subdividing the actual values relating to the cyclic operation of the manufacturing device into subsets according to one or more subparts of the cyclic operation of the manufacturing device, wherein each cycle of the cyclic operation of the manufacturing device includes multiple subparts.

3. The method of claim 2, further comprising:
   determining a statistical characteristic of the subsets; and
   creating a distribution of the statistical characteristic of each subpart for multiple cycles of the operation of the manufacturing device.

4. The method of claim 3, further comprising:
   determining a reference value for each subpart based on the trained machine learning model;
   creating a distribution of the reference value of each subpart for multiple cycles of the operation of the manufacturing device; and
   comparing the distribution of the statistical characteristic with the distribution of the reference value based on the distance function.

5. The method of claim 4, wherein comparing the distribution of the statistical characteristic with the distribution of the reference value based on the distance function comprises comparing, for each subpart, the distribution of the statistical characteristic with the distribution of the reference value based on the distance function.

6. The method of claim 2, wherein the subdividing of the actual values into subsets comprises determining subparts, the determining of the subparts comprising identifying two subsequent local minima, local maxima, or local minima and local maxima and associating the actual values between the two subsequent local minima, local maxima, or local minima and local maxima to a respective subpart, such that a subset is formed.

7. The method of claim 2, wherein the cyclical operation comprises cyclically displacing a lubricant, via outlets of a progressive distributor, and
   wherein the subparts correspond to the displacement of the lubricant via the respective outlet of the progressive distributor.

8. The method of claim 1, further comprising:
   assigning a one-hot code to an operating value of at least one variable relating to the operation of the manufacturing device based on identifying different ranges of the operating values using a mixture model; and
   inputting the one-hot code into the trained machine learning model.

9. The method of claim 8, wherein the mixture model is a gaussian mixture model.

10. The method of claim 1, further comprising:
    outputting, by the trained machine learning model, a reference value for each subpart based on the operating values input into the machine learning model, the reference values representing the same physical property as the actual values.

11. The method of claim 1, further comprising:
    determining, by one or more sensors, the operating values of the operating variables, the operating values comprising:
    a press (ram) angle or a one-hot code, of different ranges of operating values, of the press (ram) angle;
    a number of press strokes already performed in a cycle;
    a cycle time of a progressive distributor;
    a temperature of the lubricant; or
    any combination thereof.

12. The method of claim 1, wherein the alert indicates a wear of a bearing of the manufacturing device, a leak or a rupture of a lubrication line of the manufacturing device, or a combination thereof.

13. The method of claim 12, wherein the bearing is one bearing of a plurality of bearings, and
    wherein the alert indicates a wear of the one bearing of the manufacturing device, a leak or rupture of one of a plurality of lubrication lines of the manufacturing device, or a combination thereof.

14. The method of claim 1, wherein determining the statistical characteristic comprises determining extremum of the subsets.

15. The method of claim 14, wherein determining extremum of the subsets comprises determining the actual values of each subpart.

16. An apparatus comprising:
    a processor configured to:
    monitor a cyclically operating manufacturing device for detection of anomalies due to wear, tear, or wear and tear, the processor being configured to monitor the cyclically operating manufacturing device comprising the processor being configured to:
    measure actual values of a physical property relating to the operation of the manufacturing device during multiple cycles of the operation of the manufacturing device;
    determine operating values of one or more operating variables relating to the operation of the manufacturing device;
    determine reference values for the physical property for each of the multiple cycles based on a trained machine learning model, the trained machine learning model being an artificial neural network, the artificial neural network being a multilayer perceptron, the determination of the reference values comprising input of the operating values into the trained machine learning model;

compare a distribution of the actual values with a distribution of the reference values based on a distance function, the distance function being a Wasserstein distance; and initiate an alert when the distance function exceeds a predetermined threshold, the alert indicating a malfunction of the manufacturing device.

\* \* \* \* \*